US011727334B2

(12) United States Patent
Gupta et al.

(10) Patent No.: US 11,727,334 B2
(45) Date of Patent: Aug. 15, 2023

(54) MACHINE LEARNING ENABLED SUPPLIER MONITOR

(71) Applicant: SAP SE, Walldorf (DE)

(72) Inventors: Sagar Gupta, Kalka (IN); Rajkishore Sahoo, Bangalore (IN)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 17/544,402

(22) Filed: Dec. 7, 2021

(65) Prior Publication Data

US 2023/0177438 A1    Jun. 8, 2023

(51) Int. Cl.
| | |
|---|---|
| *G06Q 10/06* | (2023.01) |
| *G06Q 10/0637* | (2023.01) |
| *G06F 40/284* | (2020.01) |
| *G06F 40/40* | (2020.01) |
| *G06Q 10/0635* | (2023.01) |

(52) U.S. Cl.
CPC ..... *G06Q 10/06375* (2013.01); *G06F 40/284* (2020.01); *G06F 40/40* (2020.01); *G06Q 10/0635* (2013.01)

(58) Field of Classification Search
None
See application file for complete search history.

(56) References Cited

U.S. PATENT DOCUMENTS

| | | | |
|---|---|---|---|
| 2015/0363730 A1* | 12/2015 | Crane, Jr. ............ | G06Q 10/087 705/7.25 |
| 2018/0315141 A1* | 11/2018 | Hunn ................... | G06F 9/547 |
| 2020/0302359 A1* | 9/2020 | Jose .................... | G06N 5/02 |
| 2022/0261712 A1* | 8/2022 | Stone .................. | G06K 9/6256 |
| 2023/0056653 A1* | 2/2023 | Edwards ............. | G06F 40/279 |

FOREIGN PATENT DOCUMENTS

WO    WO-2017182982 A1 *    10/2017    ....... G06F 16/24573

OTHER PUBLICATIONS

Su, C.J. and Chen, Y.A., 2018. Risk assessment for global supplier selection using text mining. Computers & Electrical Engineering, 68, pp. 140-155 (Year: 2018).*

* cited by examiner

*Primary Examiner* — Patricia H Munson
*Assistant Examiner* — Marjorie Pujols-Cruz
(74) *Attorney, Agent, or Firm* — Mintz Levin Cohn Ferris Glovsky and Popeo, P.C.

(57) ABSTRACT

A method may include applying, to a content associated with a first supplier, a machine learning model to determine one or more objectives of an enterprise affected by an incident associated with the content. A change in a first risk associated with the first supplier may be detected based on the objectives affected by the incident. In response to detecting the change in the first risk of the first supplier, a cost associated with replacing the first supplier with the second supplier may be determined by applying the machine learning model to analyze a first electronic document associated with the first supplier. If the cost of replacing the first supplier with the second supplier and/or a second risk of the second supplier satisfy one or more thresholds, a second electronic document associated with the second supplier may be generated to address the second risk of the second supplier.

13 Claims, 9 Drawing Sheets

MACHINE LEARNING ENABLED SUPPLIER MONITOR

TECHNICAL FIELD

The subject matter described herein relates generally to machine learning and more specifically to a machine learning enabled risk controller for risk and cost analysis.

BACKGROUND

An enterprise may rely on a suite of enterprise software applications for sourcing, procurement, supply chain management, invoicing, and payment. The operations of the enterprise may also give rise to a variety of electronic documents including, for example, purchase orders, sales contracts, licensing agreements, and/or the like. As such, the enterprise software applications may integrate various electronic document management features. For example, an electronic document may include structured data, which may be stored in a data repository such as a relational database, a graph database, an in-memory database, a non-SQL (NoSQL) database, a key-value store, a document store, and/or the like. The enterprise software applications may manage an electronic document throughout its lifecycle, including creation, compliance, execution, and archiving.

SUMMARY

Systems, methods, and articles of manufacture, including computer program products, are provided for machine learning enabled risk analysis. In some example embodiments, there is provided a system that includes at least one processor and at least one memory. The at least one memory may include program code that provides operations when executed by the at least one processor. The operations may include: applying, to a first content associated with a first supplier, a machine learning model trained to determine one or more objectives of an enterprise affected by a first incident associated with the first content; detecting, based at least on the one or more objectives of the enterprise affected by the first incident associated with the first content, a change in a first risk associated with the first supplier; in response to detecting the change in the first risk of the first supplier, determining a first cost associated with replacing the first supplier with a second supplier; and in response to the first cost of replacing the first supplier with the second supplier and/or a second risk of the second supplier satisfying one or more thresholds, generating a first electronic document associated with the second supplier.

In some variations, one or more features disclosed herein including the following features can optionally be included in any feasible combination. The operations may further include: applying, to a second content associated with the second supplier, the machine learning model to determine the one or more objectives of the enterprise affected by a second incident associated with the second content; and determining, based at least on the one or more objectives affected by the second incident associated with the second content, the second risk of the second supplier.

In some variations, the first risk of the first supplier may be determined by at least generating a first composite metric corresponding to the first incident associated with the first content. The second risk of the second supplier may be determined by at least generating a second composite metric corresponding to the second incident associated with the second content.

In some variations, the first content may include one or more news articles, blogposts, and/or social media posts. The machine learning model may be trained to perform a natural language processing on a text comprising the one or more news articles, blogposts, and/or social media posts.

In some variations, the first electronic document may be generated to include a second content identified as addressing the second risk of the second supplier.

In some variations, the first electronic document may be generated by at least inserting, into a template, one or more clauses, terms, and/or line items identified as addressing the second risk of the second supplier.

In some variations, the first electronic document may include a purchase order or a purchase contract.

In some variations, the first cost of replacing the first supplier with the second supplier may be further determined in response to detecting a change in a second cost associated with the second supplier. The first cost of replacing the first supplier with the second supplier may be determined based on a second electronic document associated with the first supplier.

In some variations, the first cost replacing the first supplier with the second supplier may be determined by at least identifying, based on a metadata associated with the second electronic document, one or more clauses associated with terminating a contract with the first supplier, and extracting one or more corresponding values.

In some variations, the metadata associated with the second electronic document may be generated based on an output of the machine learning model applied to analyze a second content of the second electronic document.

In another aspect, there is provided a method for machine learning enabled risk analysis. The method may include: applying, to a first content associated with a first supplier, a machine learning model trained to determine one or more objectives of an enterprise affected by a first incident associated with the first content; detecting, based at least on the one or more objectives of the enterprise affected by the first incident associated with the first content, a change in a first risk associated with the first supplier; in response to detecting the change in the first risk of the first supplier, determining a first cost associated with replacing the first supplier with a second supplier; and in response to the first cost of replacing the first supplier with the second supplier and/or a second risk of the second supplier satisfying one or more thresholds, generating a first electronic document associated with the second supplier.

In some variations, one or more features disclosed herein including the following features can optionally be included in any feasible combination. The method may further include: applying, to a second content associated with the second supplier, the machine learning model to determine the one or more objectives of the enterprise affected by a second incident associated with the second content; and determining, based at least on the one or more objectives affected by the second incident associated with the second content, the second risk of the second supplier.

In some variations, the first risk of the first supplier may be determined by at least generating a first composite metric corresponding to the first incident associated with the first content. The second risk of the second supplier may be determined by at least generating a second composite metric corresponding to the second incident associated with the second content.

In some variations, the first content may include one or more news articles, blogposts, and/or social media posts. The machine learning model may be trained to perform a natural language processing on a text comprising the one or more news articles, blogposts, and/or social media posts.

In some variations, the first electronic document may be generated to include a second content identified as addressing the second risk of the second supplier.

In some variations, the first electronic document may be generated by at least inserting, into a template, one or more clauses, terms, and/or line items identified as addressing the second risk of the second supplier.

In some variations, the first electronic document may include a purchase order or a purchase contract.

In some variations, the first cost of replacing the first supplier with the second supplier may be further determined in response to detecting a change in a second cost associated with the second supplier. The first cost of replacing the first supplier with the second supplier may be determined based on a second electronic document associated with the first supplier.

In some variations, the first cost replacing the first supplier with the second supplier may be determined by at least identifying, based on a metadata associated with the second electronic document, one or more clauses associated with terminating a contract with the first supplier, and extracting one or more corresponding values. The metadata associated with the second electronic document may be generated based on an output of the machine learning model applied to analyze a second content of the second electronic document.

In another aspect, there is provided a computer program product including a non-transitory computer readable medium storing instructions. The instructions may cause operations may executed by at least one data processor. The operations may include: applying, to a first content associated with a first supplier, a machine learning model trained to determine one or more objectives of an enterprise affected by a first incident associated with the first content; detecting, based at least on the one or more objectives of the enterprise affected by the first incident associated with the first content, a change in a first risk associated with the first supplier; in response to detecting the change in the first risk of the first supplier, determining a first cost associated with replacing the first supplier with a second supplier; and in response to the first cost of replacing the first supplier with the second supplier and/or a second risk of the second supplier satisfying one or more thresholds, generating a first electronic document associated with the second supplier.

Implementations of the current subject matter can include methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes, it should be readily understood that such features are not intended to be limiting. The claims that follow this disclosure are intended to define the scope of the protected subject matter.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

DETAILED DESCRIPTION

Enterprise software applications may provide a variety of procurement and supply chain management solutions while integrating document management features for the electronic documents (e.g., purchase orders, sales contracts, licensing agreements, and/or the like) that may arise as a part of the process. Nevertheless, conventional procurement and supply chain management solutions fail to lend sufficient transparency to the risks and costs associated with different suppliers, particularly beyond so-called Tier 1 suppliers that provide components directly to an original equipment manufacturer (OEM). As such, in some example embodiments, a risk controller may include one or more machine learning models trained to perform supplier risk and cost analysis. For example, the risk controller may identify a supplier with minimal risk and generate one or more electronic documents (e.g., purchase orders, purchase contracts, and/or the like) mitigating the risks associated with the supplier. Moreover, the risk controller may monitor for events that affect the risk associated with the supplier. If one or more events transpire to elevate the risk associated with the supplier beyond a threshold value, the risk controller may perform a cost analysis to identify a different supplier that imposes a minimal switching cost.

Figure 1:
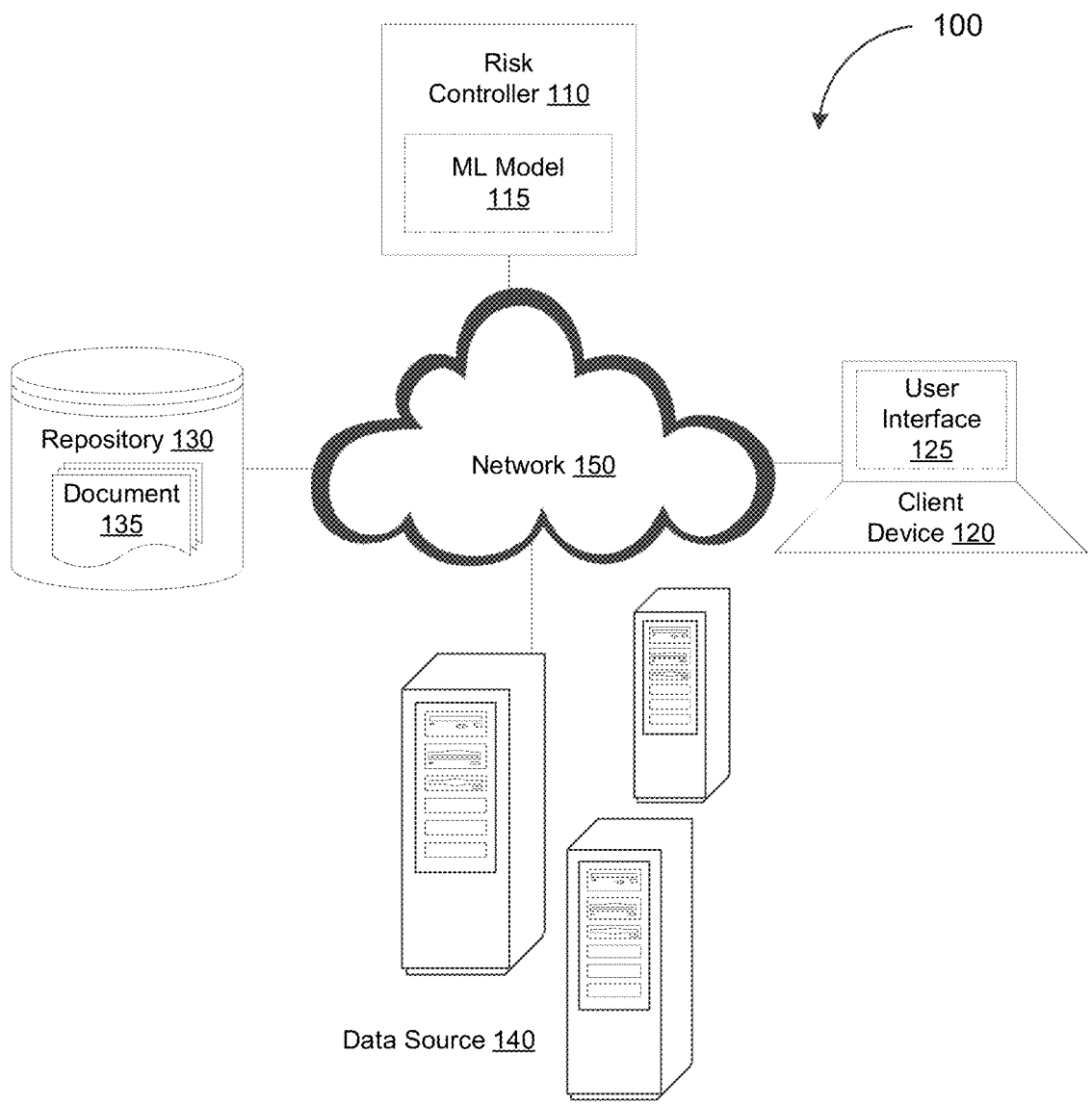
FIG. 1 depicts a system diagram illustrating an example of a procurement system, in accordance with some example embodiments.

FIG. 1 depicts a system diagram illustrating an example of a procurement system 100, in accordance with some example embodiments. Referring to FIG. 1, the procurement system 100 may include a risk controller 110, a client device 120, a repository 130, and one or more data sources 140. The risk controller 110, the client device 120, the repository 130, and the one or more data sources 140 may be communicatively coupled via a network 150. The client device 140 may be a processor-based device including, for example, a smartphone, a tablet computer, a wearable apparatus, a virtual assistant, an Internet-of-Things (IoT) appliance, and/or the like. The repository 130 may be a database including, for example, a relational database, a non-structured query language (NoSQL) database, an in-memory database, a graph database, a key-value store, a document store, and/or the like. The network 150 may be any wired network and/or a wireless network including, for example, a wide area network (WAN), a local area network (LAN), a virtual local area network (VLAN), a public land mobile network (PLMN), the Internet, and/or the like.

The risk controller 110 may include a machine learning model 115 trained to perform risk analysis for multiple suppliers in order to enable the identification of a supplier associated with a minimal risk. As shown in FIG. 1, the risk controller 110 may obtain, from the one or more data sources 140, a variety of content associated with a supplier. For example, the risk controller 110 may deploy web crawling software configured to browse the World Wide Web for content associated with the supplier. Alternatively and/or additionally, the risk controller 110 may engage a content change detection and notification service configured to poll content and alert the risk controller 110 upon detecting new content associated with the supplier. Examples of content associated with the supplier may include news articles, blogposts, and social media posts relevant to the supplier.

The risk controller 110 may apply, to the content associated with each supplier, the machine learning model 115 in order to determine the risks posed by different suppliers including, for example, economic risks, regulatory risks, security and fraud risks, financial risk, reputation risks, operational risks, competitive risks, and/or the like. Depending on the types and magnitude of the risks posed by a supplier, the risk controller 110 may determine whether that supplier is consistent with the objectives of an enterprise such as ethical labor practices, customer commitment, fairness, environmental awareness, integrity and transparency, and/or the like. Accordingly, in some example embodiments, the machine learning model 115 may be trained to identify the types of incidents indicated by each piece of content associated with a supplier and assign one or more corresponding labels. Furthermore, the risk controller 110 may determine, based at least on the types of incidents associated with the supplier, how well the supplier conforms to the objectives of the enterprise. For instance, the machine learning model 115 may be further trained to map each type of incident to one or more objectives. As such, the risk controller 110 may determine, based at least on the types of incidents associated with the supplier, a compliance metric indicative of how well the supplier conforms to each one of the enterprise's objectives. In some cases, the risk controller 110 may select a supplier for the enterprise including by generating, based at least on a first supplier having higher compliance metrics than a second supplier, a recommendation for the enterprise that includes the first supplier instead of the second supplier.

In some example embodiments, the machine learning model 115 may be trained to perform natural language processing by at least assigning, to each piece of content associated with a supplier, one or more labels corresponding to the types of incidents indicated by the content. Table 1 below depicts examples of incidents such as accidents, expansion, bankruptcy, divestment, downsizing, and/or the like. As shown in Table 1, each type of incident may be associated with a severity metric, which the risk controller 110 may use in computing risk metrics for the supplier. Moreover, the machine learning model 115 may be trained to map each type of incident to one or more corresponding objectives. For example, incidents of intellectual property infringement may reflect on the supplier's integrity and transparency. Accordingly, the machine learning model 115 may be trained to map intellectual property infringement incidents to the objective for integrity and transparency such that the supplier's conformity metric for integrity and transparency are computed to account for the intellectual property infringement incidents associated with the supplier.

TABLE 1

| Incident Type | Description | Default Severity |
|---|---|---|
| Accident | Incidents like aviation disasters, explosions, fire, and industrial, maritime, mining, nuclear, and railway accidents. | Low |
| Corporate Expansion | Any type of expansion like announcements of new products or plants. | Low |
| Complaints | Cases like lawsuits or complaints against a company. | Medium |
| Contract | New sales contracts, corporate partnerships, and joint ventures. | Low |
| Corporate Ban | Any reported ban against a company. | Medium |
| Corporate Bankruptcy | (Possible) bankruptcy; for example, a Chapter 11 filing by the company or selection of an external financial advisor such as a bank. | High |

TABLE 1-continued

| Incident Type | Description | Default Severity |
| --- | --- | --- |
| Corporate Credit Rating Downgrade | The company's credit rating has been downgraded. | Medium |
| Corruption & Bribery | Cases such as corruption, fraud, forgery, insider trading, corporate crime, conflict of interest, or financial reporting fraud. | Medium |
| Cyber Threats | Cases such as a vulnerability or malicious attempt to damage or disrupt the company's computer network or system. | Medium |
| Deteriorating Financial Situation | General decline in the supplier's financial situation; for example, a reduction in earnings or sales. | Medium |
| Divestment | The company has performed a divestiture or an entity has divested from the company. | High |
| Downsizing | Staff cuts or layoffs at a company location. | Medium |
| Environmental Issue | Incidents such as chemical spills, radioactive contamination, or waste management issues. | Medium |
| Ethical Practice | The company's ethical practices. For example, using ecological, sustainable practices, promoting zero-waste, a cage free environment. | Ignore |
| Financial Penalty | Any kind of financial penalty or fine against the company | Medium |
| Geopolitical Issue | Cases such as border issues, financial mechanism failure, militant incidents, unrest, civil disobedience, protests, demonstrations, or riots affecting the company. | Low |
| Illegal Trade | Any kind of illegal trade or human trafficking. | Medium |
| Insolvency | Company is either insolvent or openly threatened by insolvency. | High |
| Intellectual Property Infringement | Any IP, copyright, patent, or trademark violations. | Medium |
| International Sanction | Any impact that embargoes or other international sanctions against a country/region might have on a company. | Low |
| Joint Ventures Partnership | The company belongs to an entity created by two or more parties, generally characterized by shared ownership, returns and risks, and governance. | Ignore |
| Labor Issue | Cases such as general strikes or labor disputes. | Low |
| Liquidity Crisis | Any reported liquidity shortages for the company. | Low |
| Natural Disaster | Any kind of natural disaster that affects the company location. | Low |
| Ownership Change | Any ownership change such as buying or selling stakes, buyouts, mergers, asset sales, acquisitions, privatizations, or spin-offs. | Medium |
| Pandemic | An outbreak of a disease that occurs over a wide geographic area and affects an exceptionally high proportion of the population. Pandemic is in adverse media monitoring in the Operational risk category. It's a negative incident type. Pandemic sub-incident types: 2019 novel corona virus Bird flu Cholera Deadly epidemic infections Dengue fever Ebola MERS Plague Polio | Medium |

TABLE 1-continued

| Incident Type | Description | Default Severity |
| --- | --- | --- |
| | SARS<br>Smallpox<br>Swine flu<br>Zika fever | |
| Plant Disruption | Cases such as plant shutdowns, or blackouts. | Medium |
| Product Issue | Cases such as technical failures, quality issues, or product recalls. | Medium |
| Project Issue | Cases such as project delays or project failures. | Medium |
| Public Health | Cases such as health issues or food poisoning cases. | Low |
| Regulatory Compliance Issue | Cases such as nepotism, unethical practices, workplace discrimination, workplace safety issues, child labor, anticompetitive behavior, money laundering, or sanctions violations. | High |
| Senior Management Change | Replacement or recruitment in the company's top management. | Low |
| Transportation Issue | Cases such as security risks, transportation delays, or air traffic risk. | Low |
| Watchlists and Sanctions | By Risk Category Information API for Supplier Risk Exposure: The API imports external sanction and watchlist compliance data.<br>By subscription: Third-party checks on regulatory and compliance violations including sanctions and watchlist monitoring, anti-corruption and bribery violations, regulatory and compliance violation reports. | Medium |

In some example embodiments, the machine learning model 115 may be trained to perform text classification (e.g., FastText classification and/or the like) in order to identify, based on content associated with a supplier, the types of incidents associated with the supplier and the objectives affected by these incidents. For example, as noted, incidents of intellectual property infringement may reflect on the supplier's integrity and transparency. Accordingly, the machine learning model 115 may be trained to identify, based on content associated with the supplier, incidents of intellectual property infringement associated with the supplier and map these incidents to the objective for integrity and transparency. To further illustrate, FIG. 2 depicts a flowchart illustrating an example of a process 200 for machine learning enabled supplier risk stratification, which may include training a machine learning model and applying the trained machine learning model to identify the objectives affected by one or more incidents associated with a supplier.

Figure 2:
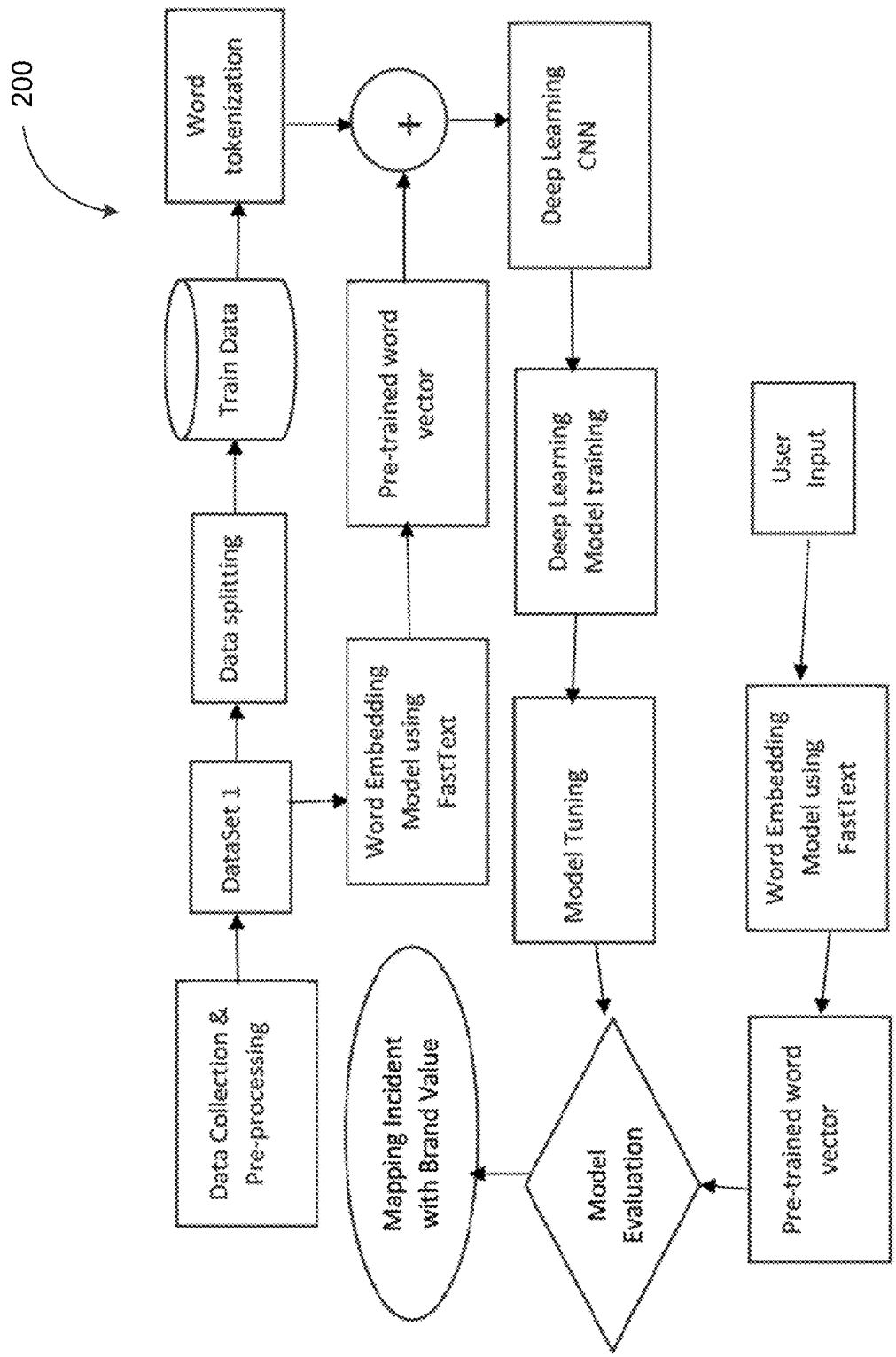
FIG. 2 depicts a flowchart illustrating an example of a process for machine learning enabled supplier risk stratification, in accordance with some example embodiments.

As shown in FIG. 2, prior to applying the machine learning model 115, a piece of content (e.g., a news article, a blogpost, a social media post, and/or the like) may be preprocessed by at least tokenizing the text included in the content to form a plurality of tokens, each of which corresponding to one or more characters that form a partial word or a full word from the text. The preprocessing performed by risk controller 110 may include removal of stop words, removal of typographical errors, and normalization. To reduce noise in the input provided to the machine learning model 115, the risk controller 110 may also remove outlier words (or tokens) by performing, for example, term frequency—inverse document frequency (TF-IDF) (Term Frequency, Inverse Document Frequency) to remove words (or tokens) that appear with an above-threshold frequency and/or below-threshold frequency.

In some example embodiments, the risk controller 110 may embed each word (or token) in the text to form a matrix representation in which each vector in the matrix corresponds to a single word (or token) from the text. Embedding a word (token) may include transforming the word (or token) to form a corresponding vector representation of the token in which the value of the token is expressed as one or more numerical values. It should be appreciated that when processing text from multiple pieces of content, the risk controller 110 may generate a tensor that includes multiple matrices of vectors, each of which corresponding to a single piece of content.

In some example embodiments, the risk controller 110 may generate word embeddings that capture the contextual, word-to-word relationship of each word in a multidimensional space. For example, the risk controller 110 may apply a continuous-bag-of-words (CBOW) model, which is a neural network trained to predict a target word based on the distributed representations of the context words surrounding the target word. Alternatively and/or additionally, the risk controller 110 may apply a skip-gram model, which is a neural network trained to predict the context words surrounding the target word. With either model, context words may refer to words that appear within a fixed size window around the target word. For instance, given the sentence "Poets have been mysteriously silent on the subject of cheese" and the target word "silent." the skip-gram model may be applied to predict the target word "silent" based on context words around the target word such as "subject" and "mysteriously." Contrastingly, the continuous-bag-of-words (CBOW) model may be applied to predict the target word "silent" based on the surrounding context words like "mysteriously" and "subject." In the latter case, the target word "silent" may be predicted based on the sum of the vector representations of the surrounding context words. It should be appreciated that the risk controller 110 may a variety of embedding techniques, such as one hot encoding and binary encoding, instead of and/or in addition to the continuous-bag-of-words (CBOW) model and the skip-gram model.

The risk controller 110 may apply, to the preprocessed and embedded content associated with a supplier, the machine learning model 115 to identify the risks posed by the supplier. In some example embodiments, the machine learning model 115 may be trained in a supervised manner using, for example, a single-label dataset in which each text sample is associated with a label corresponding to the object affected by the type of incident described in the text sample. The machine learning model 115 may be trained on high dimensional data (e.g., 100 dimensions or more) and a fixed window size (e.g., 5 or a different window size) for multiple word embedding techniques (e.g., continuous-bag-of-words (CBOW) model and skip-gram model) to increase the robustness and accuracy of the machine learning model 115. The machine learning model 115 may be implemented using a variety of machine learning models including, for example, a convolutional neural network, a recurrent neural network, a regression model, an instance-based model, a regularization model, a decision tree, a random forest, a Bayesian model, a clustering model, an associative model, a deep learning model, a dimensionality reduction model, and/or an ensemble model.

Figure 3:
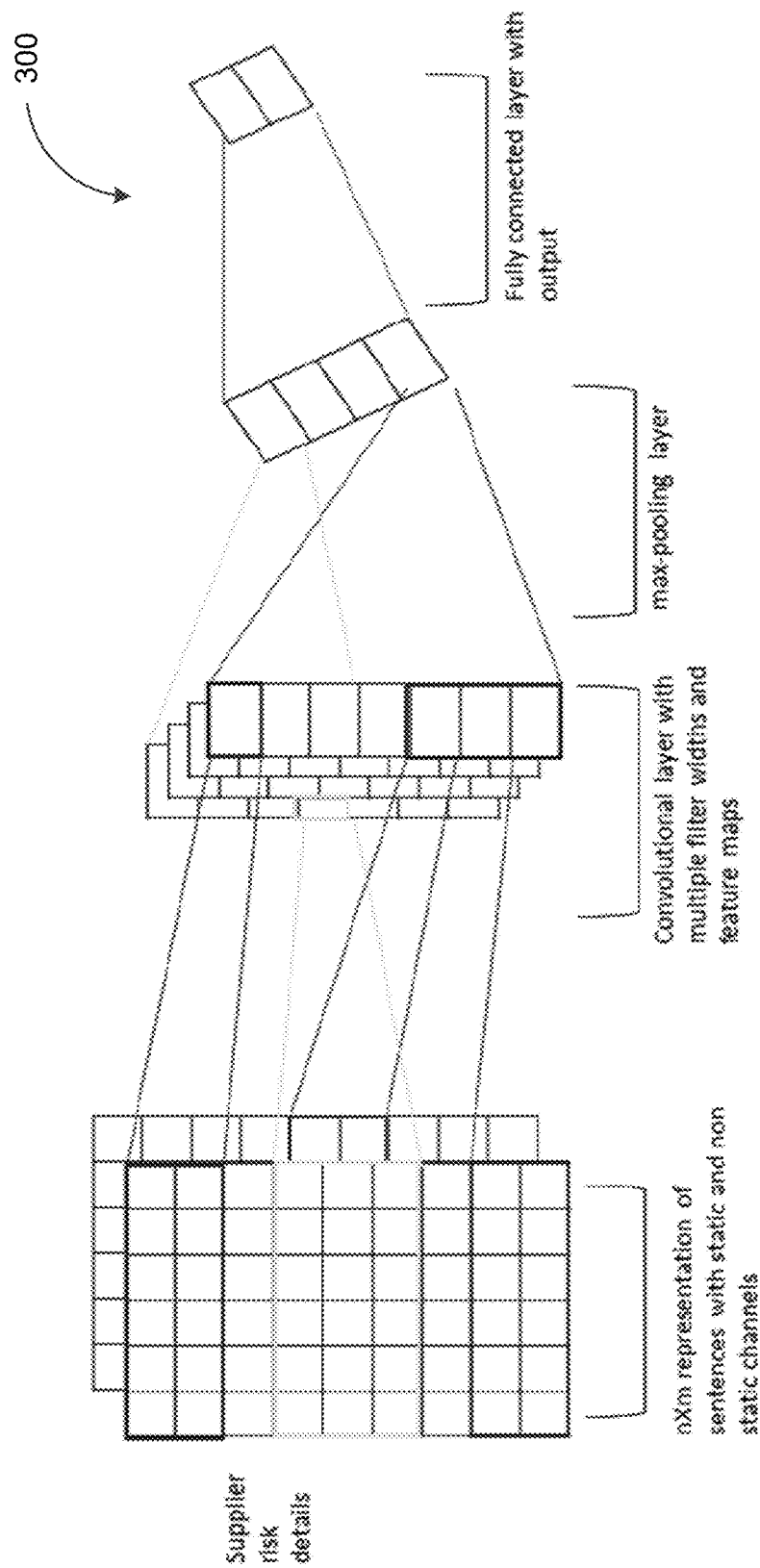
FIG. 3 depicts a schematic diagram illustrating an example of a multi-channel convolutional neural network, in accordance with some example embodiments.

In some example embodiments, the machine learning model 115 may be configured as a multi-channel convolutional neural network, which processes the text forming the content associated with a supplier as individual words (or tokens) called unigrams and as concatenations of two or more consecutive words (or tokens) called n-grams. To further illustrate, FIG. 3 depicts an example of a multi-channel convolutional neural network 300 with, for example, a first channel for processing unigrams and a second channel for processing bigrams. Each channel of the multi-channel convolutional neural network 300 may include an input layer that defines the length of input sequences, an embedding layer set to the size of the vocabulary and multi-dimensional real-valued representations, a one-dimensional convolutional layer with a plurality of filters and a kernel size set to the quantity of words (or tokens) to read at once, a max pooling layer consolidating the output from the convolutional layer, and a flatten layer to reduce the three-dimensional output of the max pooling layer to two dimensions for concatenation. The output from each channel of the multi-channel convolutional neural network 300 may be concatenated into single vector and processed by a dense layer and an output layer to generate, for example, the probability of the type of incident described in the text associated with the supplier affecting each one of a variety of objectives such as ethical labor practices, customer commitment, fairness, environmental awareness, integrity and transparency, and/or the like.

Figure 4:
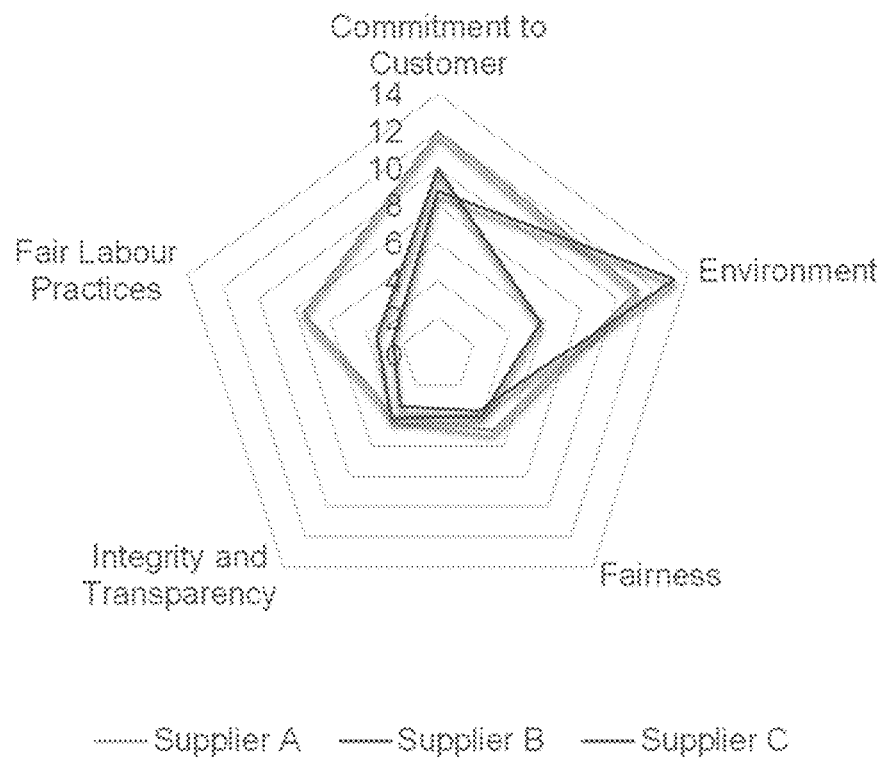
FIG. 4 depicts an example of a comparative analysis between multiple suppliers, in accordance with some example embodiments.

In some example embodiments, the risk controller 110 may compute, for each supplier, a metric for each objective based on the corresponding types of incidents. Moreover, the risk controller 110 may compute, for each supplier, a composite metric corresponding to the individual metric associated with each objective. The composite metric may reflect how well a supplier conforms to the objectives of an enterprise and thus pose a minimal risk. As such, the risk controller 110 may be configured to identify, based at least on the composite metric of each of a selection of supplier, one or more suppliers associated with a minimal risk. To further illustrate, FIG. 4 depicts an example of a composite metric that takes into account the individual metrics for a variety of objectives including, for example, ethical labor practices, customer commitment, fairness, environmental awareness, and integrity and transparency. In the example shown in FIG. 4, the risk controller 110 may determine a first composite metric for Supplier A, a second composite metric for Supplier B, and a third composite metric for Supplier C in order to enable a comparative analysis between Supplier A, Supplier B, and Supplier C. For instance, in some example embodiments, the risk controller 110 may generate a recommendation that includes Supplier A based at least on Supplier A having a higher composite metric than Supplier B and Supplier C. Referring again to FIG. 1, the recommendation generated by the risk controller 110 may be displayed in a user interface 125 at the client device 120.

Figure 5:
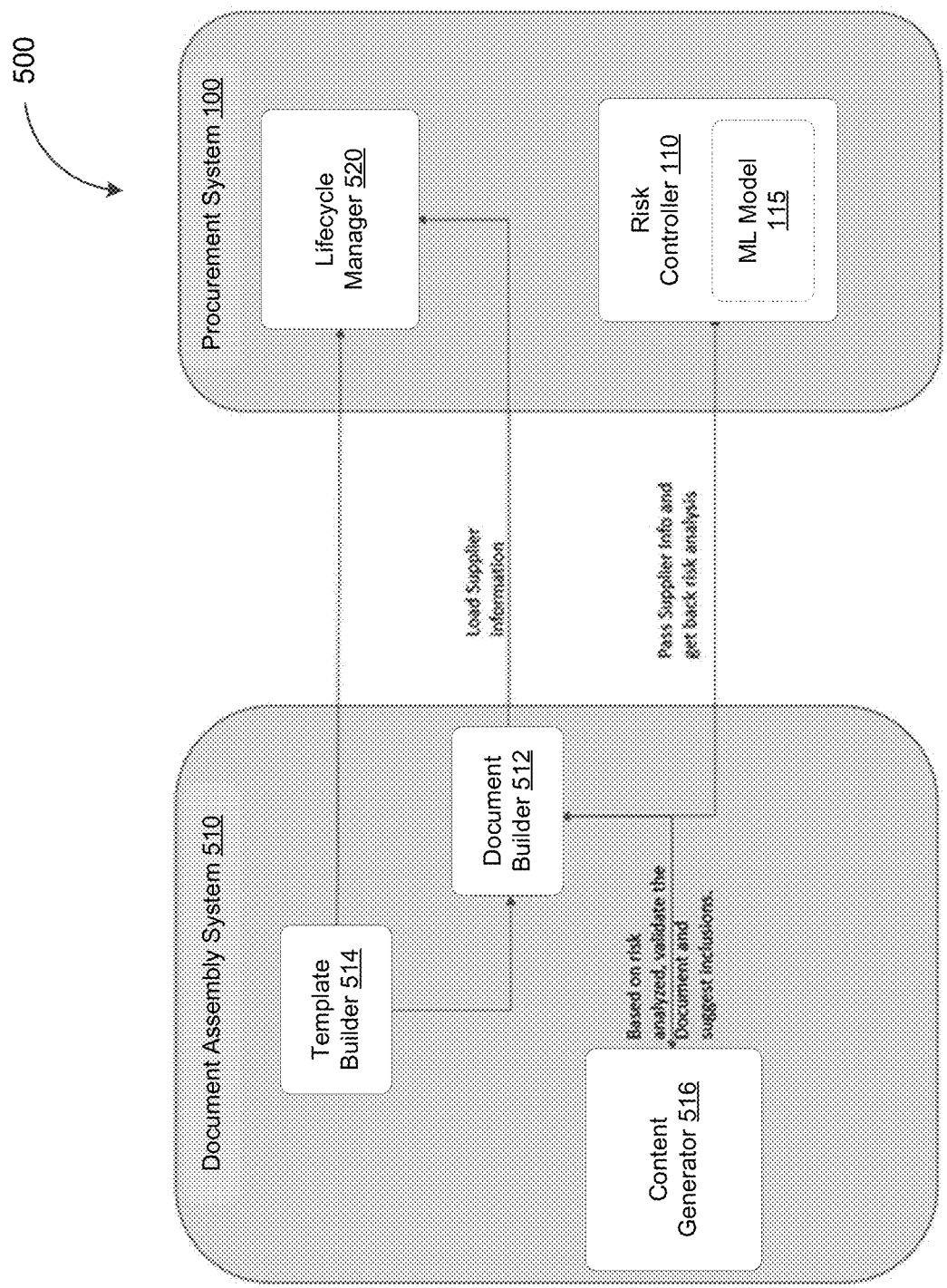
FIG. 5 depicts a block diagram illustrating an example of a risk mitigation system, in accordance with some example embodiments.

In some example embodiments, the risk controller 110 may generate one or more electronic documents (e.g., purchase orders, purchase contracts, and/or the like) mitigating one or more of the risks associated with the supplier. For example, the risk controller 110 may receive, from the client device 120, one or more user inputs selecting a supplier, such as the supplier identified by the risk controller 110 as being associated with a minimal risk. Accordingly, the risk controller 110 may generate, based at least on the types of incidents the machine learning model 115 identified as being associated with the supplier, a contract with one or more clauses, terms, and/or line items addressing the corresponding risks. To further illustrate, FIG. 5 depicts a block diagram illustrating an example of a risk mitigation system 900, in accordance with some example embodiments. As shown in FIG. 5, the risk mitigation system 900 may include a document assembly system 510, which interacts with the procurement system 100 to generate one or more electronic documents (e.g., purchase orders, purchase contracts, and/or the like) configured to mitigate one or more of the risks associated with a supplier.

Referring again to FIG. 5, to generate an electronic document (e.g., a purchase orders, a purchase contract, and/or the like) for a supplier, the risk controller 110 may send, to a document builder 512 at the document assembly system 510, one or more risks associated with the supplier. In the example shown in FIG. 5, the document builder 512 may generate the electronic document based on a template provided by a template builder 514. In some cases, the template may be one of a plurality of predefined templates selected based on one or more user inputs received, for example, from the client device 120. Alternatively and/or additionally, the template may be customized and/or created de novo based on one or more user inputs received from the client device 120. Moreover, the document builder 512 may generate the electronic document by at least inserting, into the template provided by the template builder 514, content (e.g., clauses, terms, line items, and/or the like) that a content generator 516 identifies as mitigating the one or more risks associated with the supplier.

As used herein, a document may refer to any voluntary arrangement between two or more parties that is enforceable by law as a binding legal agreement. A clause may refer to a provision within a document that addresses one or more aspects of the document including, for example, compensation, warranty, confidentiality, dispute resolution, ethics, force majeure, governing law, choice of language, damages, indemnification, and/or the like. Meanwhile, a term may refer to the specific conditions and/or obligations set forth within a clause of a document including, for example, price, time, and/or the like. A line item may identify a specific commodity that is being transacted (e.g., sold, purchased, leased, and/or the like) under a document.

For example, the risk controller 110 may determine that the supplier is associated with one or more regulatory risks based on the types of incidents the machine learning model 115 identified as being associated with the supplier. As such, the content generator 516 may identify one or more clauses and terms configured to mitigate these regulatory risks. The document builder 512 may generate the electronic document by at least inserting, into the template provided by the template builder 514, the one or more clauses and terms mitigating the regulatory risks associated with the supplier. In the example shown in FIG. 5, the electronic document may be sent to a lifecycle manager 520 at the procurement system 100. The lifecycle manager 520 may be configured to manage the electronic document throughout a multistage lifecycle including, for example, creation, execution, storage, disposition, and/or the like.

In some example embodiments, the risk controller 110 may be configured to perform continuous monitoring of the risks associated with one or more suppliers. For example, the risk controller 110 may be configured to monitor for the occurrence of one or more external events and determine whether these events alter the risks associated with the supplier. Referring again to FIG. 1, the risk controller 110 may obtain, on a continuous basis, a variety of content associated with the supplier from the one or more data sources 140. Moreover, the risk controller 110 may apply the machine learning model 115 to the content associated with the supplier to determine the current risks associated with the supplier. For instance, the risk controller 110 may apply the machine learning model 115 to determine the risks associated with the supplier at a first time and the risks associated with the supplier at a second time. The risks associated with the supplier at the first time and the second time may include a respective composite metric indicative of how well the supplier conforms to the objectives of the enterprise at the first time and the second time. In the event the risk controller 110 detects a change in the risks associated with the supplier (e.g., a difference between the risk at the first time and the risk at the second time), the risk controller 110 may generate one or more alerts, for example, for display at the client device 120.

Figure 6:
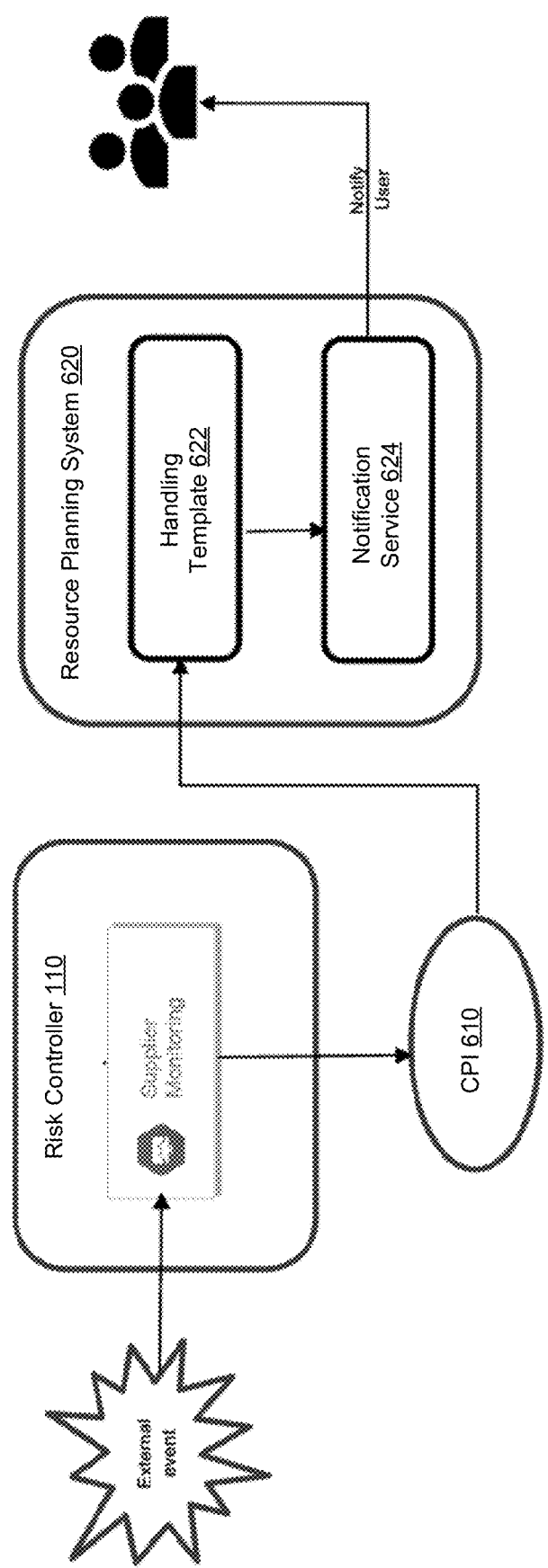
FIG. 6 depicts a block diagram illustrating an example of a risk monitoring system, in accordance with some example embodiments.

To further illustrate, FIG. 6 depicts a block diagram illustrating an example of a risk monitoring system 600, in accordance with some example embodiments. As shown in FIG. 6, the risk monitoring system 600 may include the risk controller 110, which performs risk monitoring by detecting the occurrence of one or more external events and determining the corresponding effects on the risks associated with the supplier. In the example shown in FIG. 6, the risk controller 110 may be integrated with a resource planning system 620 (e.g., an enterprise resource planning (ERP) system and/or the like) through a cloud platform integrator 610. The resource planning system 620 may include a handling template 622 and a notification service 624. Accordingly, in response to the risk controller 110 detecting a change in the risks associated with a supplier, the resource planning system 620 may determine, based at least on the handling template 622, whether to engage the notification service 624. For example, the handling template 622 may impose certain severity and/or criticality thresholds. As such, if the changes in the risks associated with the supplier satisfy one or more severity and/or criticality thresholds imposed by the handling template 622, the resource planning system 620 may raise a notification request at the notification service 624. In response to the notification request, the notification service 624 may send, for example, to the client device 120, a corresponding alert (e.g., a live notification to take certain actions).

In some example embodiments, the risk controller 110 may generate a recommendation including one or more alternate suppliers to replace an existing supplier in response to an above-threshold change in the risk associated with the existing supplier. For example, the risk controller 110 may monitor for the occurrence of one or more external events and determine whether these events alter the risks associated with the existing supplier. The risk associated with the existing supplier, which may correspond to how well the supplier conforms to one or more objectives of the enterprise, may change by more than a threshold value. In response to detecting the above-threshold change in the risk associated with the existing supplier, the risk controller 110 may determine the cost associated with replacing the existing supplier with one or more alternate suppliers. For instance, the risk controller 110 may determine the cost of replacing the existing supplier by at least determining, based on one or more electronic documents (e.g., purchase orders, sales contracts, and/or the like) associated with the existing supplier, a first cost associated with terminating the contract with the existing supplier. The first cost may include, for example, a "settlement value" and/or a "contract termination cost" specified in the one or more electronic documents associated with the existing supplier. The risk controller 110 may therefore determine the first cost by at least identifying, based on the metadata associated with the one or more electronic documents, one or more relevant clauses (e.g., termination clause, damages clause, and/or the like) before extracting the corresponding values. It should be appreciated that the metadata identifying the clauses included in an electronic document may be generated based on the outputs of the machine learning model 115 applied to analyse the contents of the electronic document. In some cases, the first cost may include damages prorated based on the proportion of the obligation already fulfilled under the contract (e.g., terminating a 4-year contract after 3 years).

Alternatively and/or additionally, the risk controller 110 may determine the cost of replacing the existing supplier by at least determining the cost of obtaining the same asset from the one or more alternate suppliers. The cost of obtaining the same asset (e.g., materials, services, and/or the like) from the one or more alternate suppliers may include the price quoted by the alternate suppliers. It should be appreciated that the risk controller 110 may generate a recommendation including a first alternate supplier instead of a second alternate supplier based at least on first alternate supplier being associated with a lower cost than the second alternate supplier. Moreover, the risk controller 110 may generate the recommendation to include the first alternate supplier instead of the second alternate supplier based at least on the first alternate supplier being associated with a better risk profile (e.g., higher composite metric indicative of better conformity to the one or more objectives of the enterprise) than the second alternate supplier.

The risk controller 110 may also generate a recommendation including the one or more alternate suppliers to replace the existing supplier in response to the one or more alternate suppliers being associated with a lower cost and a same (or better) risk profile (e.g., same or higher composite metric indicative of conformity to the one or more objectives of the enterprise) than the existing supplier. In this case, the cost associated with the one or more alternate suppliers may include the cost of terminating one or more contracts with the existing supplier. Thus, it should be appreciated that the risk controller 110 may generate the recommendation to include an alternate supplier if a first cost of terminating the contracts with the existing supplier combined a second cost of obtaining assets (e.g., materials, services, and/or the like) from the alternate supplier is less than a third cost of continuing to obtain the same assets from the existing supplier. Moreover, it should be appreciated that the risk controller 110 may identify multiple alternate suppliers in order to satisfy the obligations set forth in the one or more electronic documents (e.g., purchase orders, sales contracts, and/or the like) associated with the existing supplier. For example, the risk controller 110 may identify multiple alternate suppliers in order to meet a quantity obligation and/or a timing obligation imposed on the existing supplier.

Figure 7:
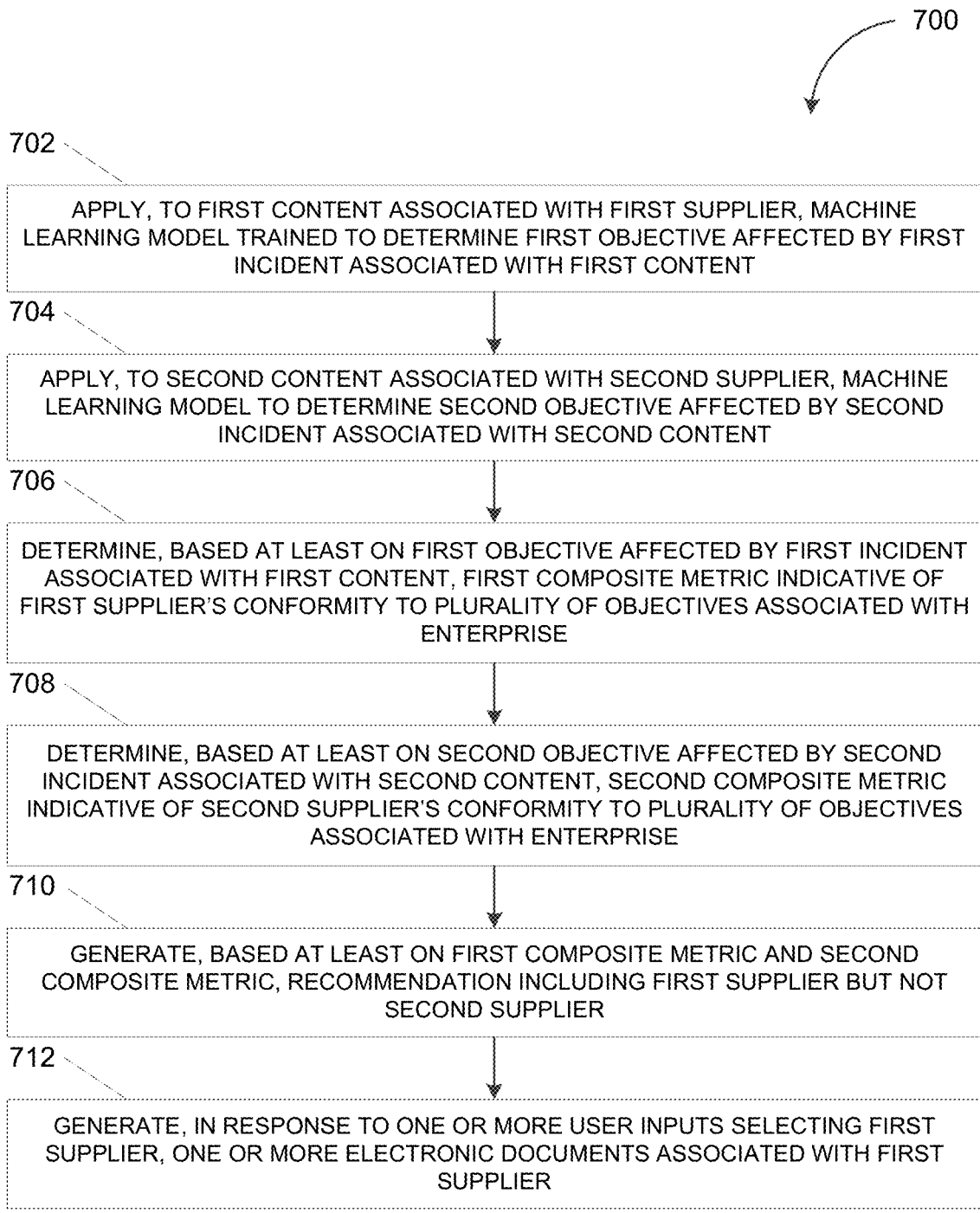
FIG. 7 depicts a flowchart illustrating an example of a process for supplier risk stratification, in accordance with some example embodiments.

FIG. 7 depicts a flowchart illustrating an example of a process 700 for supplier risk stratification, in accordance with some example embodiments. Referring to FIGS. 1 and 7, the process 700 may be performed by the risk controller 110 in order to identify a supplier with minimal risk.

At 702, the risk controller 110 may apply, to a first content associated with a first supplier, a machine learning model trained to determine a first objective affected by a first incident associated with the first content. In some example embodiments, the risk controller 110 may obtain, from the one or more data sources 140, a variety of content associated with one or more suppliers including, for example, news articles, blogposts, social media posts, and/or the like. Furthermore, the risk controller 110 may apply to the content associated with each supplier, the machine learning model 115 in order to identify the risks posed by each suppliers including, for example, economic risks, regulatory risks, security and fraud risks, financial risk, reputation risks, operational risks, competitive risks, and/or the like. The machine learning model 115 may be trained to identify the types of incidents indicated by each piece of content and map the incidents to objectives affected by the incidents such as ethical labor practices, customer commitment, fairness, environmental awareness, integrity and transparency, and/or the like. For example, the machine learning model 115 may identify incidents of intellectual property infringement and map the intellectual property infringement incidents to the objective for integrity and transparency.

At 704, the risk controller 110 may apply, to a second content associated with a second supplier, the machine learning model to determine a second objective affected by a second incident associated with the second content. In some example embodiments, the risk controller 110 may be configured to determine the risk associated with multiple suppliers including by applying the machine learning model 115 to content associated with multiple suppliers. The machine learning model 115 may be applied to identify incidents associated with multiple suppliers and map these incidents to the corresponding objectives.

At 706, the risk controller 110 may determine, based at least on the first objective affected by the first incident associated with the first content, a first composite metric indicative the first supplier's conformity to a plurality of objectives associated with an enterprise. In some example embodiments, the risk controller 110 may determine, based at least on the objectives affected by the incidents associated with each supplier, a composite metric indicative of how well each supplier conforms to the objectives of an enterprise. As noted, examples of objectives include ethical labor practices, customer commitment, fairness, environmental awareness, and integrity and transparency.

At 708, the risk controller 110 may determine, based at least on the second objective affected by the second incident associated with the second content, a second composite metric indicative of how well the second supplier conforms to the plurality of objectives associated with the enterprise. In some example embodiments, the risk controller 110 may determine, for each supplier in a selection of suppliers, a composite metric indicative of how well the supplier conforms to the objectives of the enterprise. The risk controller 110 may determine, based at least on a first supplier having a higher composite metric than a second supplier, that the first supplier poses fewer risks than the second supplier. For example, as shown in FIG. 4, the risk controller 110 may determine a first composite metric for Supplier A, a second composite metric for Supplier B, and a third composite metric for Supplier C in order to enable a comparative analysis between Supplier A, Supplier B, and Supplier C.

At 710, the risk controller 110 may generate, based at least on the first composite metric and the second composite metric, a recommendation including the first supplier but not the second supplier. For instance, in the example shown in FIG. 4, the risk controller 110 may generate a recommendation that includes Supplier A based at least on Supplier A having a higher composite metric than Supplier B and Supplier C. The risk controller 110 may generate the recommendation to include Supplier A (but not Supplier B and Supplier C) at least because Supplier A having a higher composite metric than Supplier B and Supplier C indicates that Supplier A is associated with fewer risks than Supplier B and Supplier C.

At 712, the risk supplier 110 may generate, in response to one or more user inputs selecting the first supplier, one or more electronic documents associated with the first supplier. For example, the risk controller 110 may receive, from the client device 120, one or more user inputs selecting a supplier, such as the supplier identified by the risk controller 110 as being associated with a minimal risk. Accordingly, the risk controller 110 may generate, based at least on the types of incidents the machine learning model 115 identified as being associated with the supplier, one or more electronic documents (e.g., purchase orders, purchase contracts, and/or the like) configured to mitigate the risks associated with the supplier. For instance, the risk controller 110 may generate a contract with one or more clauses, terms, and/or line items addressing the corresponding risks.

Figure 8:
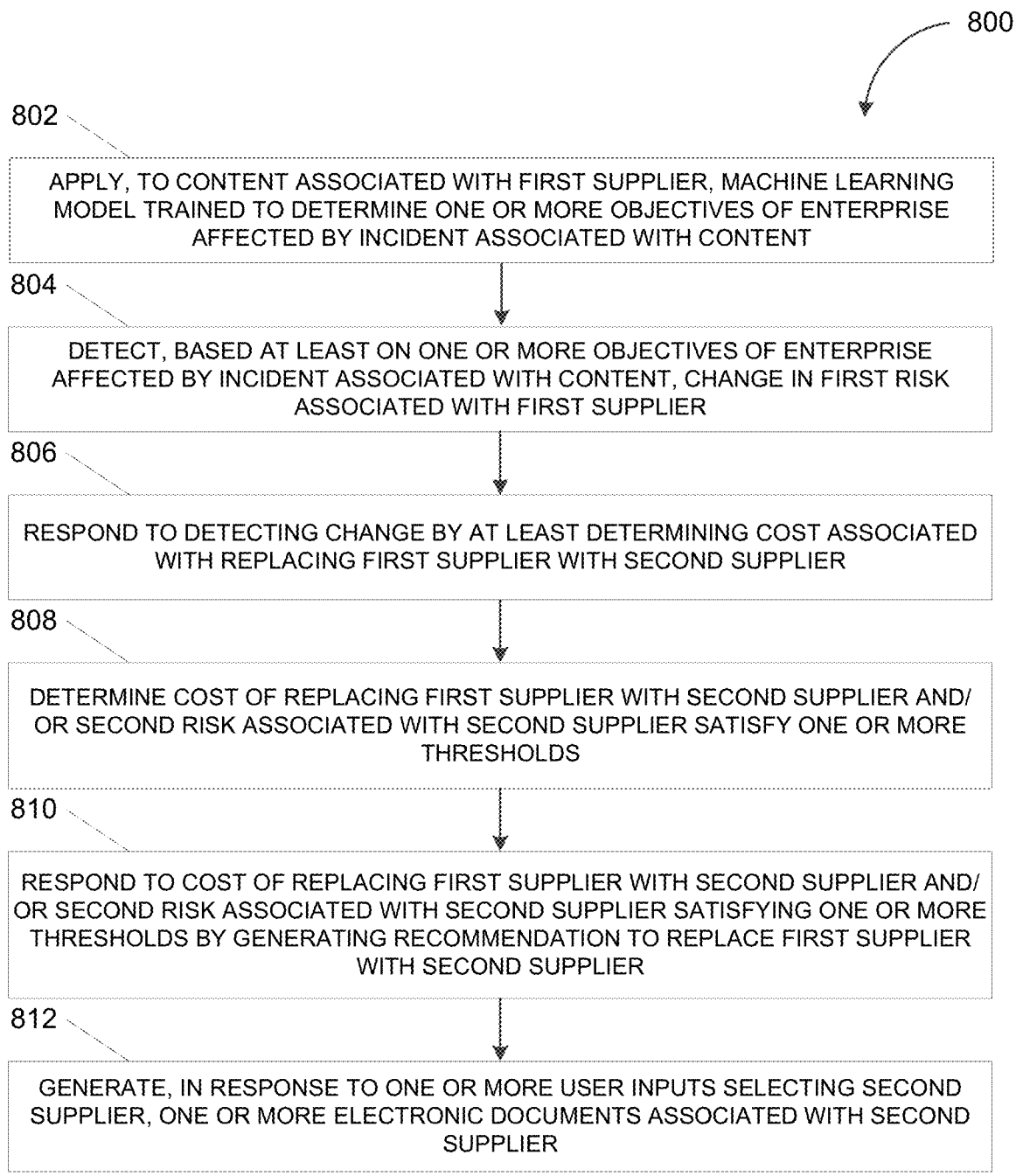
FIG. 8 depicts a flowchart illustrating an example of a process for supplier monitoring, in accordance with some example embodiments.

FIG. 8 depicts a flowchart illustrating an example of a process 800 for supplier monitoring, in accordance with some example embodiments. Referring to FIGS. 1 and 8, the process 800 may be performed by the risk controller 110 in order to monitor the risks and costs associated with existing and alternate suppliers.

At 802, the risk controller 110 may apply, to a content associated with a first supplier, a machine learning model trained to determine one or more objectives of an enterprise affected by an incident associated with the content. In some example embodiments, the risk controller 110 may obtain, from the one or more data sources 140, a variety of content associated with one or more suppliers including, for example, news articles, blogposts, social media posts, and/or the like. At least a portion of the content obtained from the one or more data sources 140 may be associated with incidents that affect the risks posed by a supplier including by affecting the degree to which the supplier complies with the objectives of an enterprise. As such, the risk controller 110 may apply, to the content associated with each supplier, the machine learning model 115 to identify the types of incidents indicated by each piece of content and map the incidents to the corresponding objectives (e.g., ethical labor practices, customer commitment, fairness, environmental awareness, integrity and transparency, and/or the like). For example, the machine learning model 115 may identify incidents of intellectual property infringement and map the intellectual property infringement incidents to the objective for integrity and transparency. A change in how well a supplier complies with the objective for integrity and transparency may elevate the risk posed by that supplier.

At 804, the risk controller 110 may detect, based at least on the one or more objectives of the enterprise affected by the incident associated with the content, a change in a first risk associated with the first supplier. In some example embodiments, the risk controller 110 may monitor the risks associated with one or more suppliers, including the supplier selected for providing one or more assets (e.g., materials, services, and/or the like), on a continuous basis. For example, the risk controller 110 may obtain, on a continuous basis, a variety of content associated with various suppliers from the one or more data sources 140. Moreover, the risk controller 110 may apply the machine learning model 115 to the content associated with each supplier to determine the current risks associated with the supplier. For instance, the risk controller 110 may apply the machine learning model 115 to determine a first composite metric indicative of the risks associated with a supplier at a first time and a second composite metric indicative of the risks associated with the supplier at a second time. In the event the risk controller 110 detects a change in the risks associated with the supplier (e.g., an above-threshold difference between the first composite metric and the second composite metric), the risk controller 110 may determine to replace the supplier with an alternate supplier with a better risk profile (e.g., higher composite metric indicative of better conformity to the one or more objectives of the enterprise).

Alternatively and/or additionally, the risk controller 110 may determine to replace the supplier with an alternate supplier in response to the risk controller 110 identifying the alternate supplier as being associated with a lower cost. The cost associated with the alternate supplier may include the cost of terminating one or more contracts with the existing supplier. As such, the risk controller 110 may determine to replace the supplier with the alternate supplier if the cost of terminating the contracts with the existing supplier combined the cost of obtaining assets (e.g., materials, services, and/or the like) from the alternate supplier is less than the cost of continuing to obtain the same assets from the existing supplier.

At 806, the risk controller 110 may respond to detecting the change by at least determining a cost associated with replacing the first supplier with a second supplier. In some example embodiments, the risk controller 110 may determine the cost associated with replacing the existing supplier with the alternate supplier by at least determining, based on one or more electronic documents (e.g., purchase orders, sales contracts, and/or the like) associated with the existing supplier, the cost associated with terminating the contract with the existing supplier. The cost associated with terminating the contract with the existing supplier may include, for example, a "settlement value" and/or a "contract termination cost" specified in the one or more electronic documents associated with the existing supplier. Accordingly, the risk controller 110 may determine the cost of terminating the contract with the existing supplier by at least identifying, based on the metadata associated with the one or more electronic documents, one or more relevant clauses (e.g., termination clause, damages clause, and/or the like) before extracting the corresponding values. As noted, the metadata identifying the clauses included in an electronic document may be generated based on the outputs of the machine learning model 115 applied to analyse the contents of the electronic document. In some cases, the cost of terminating the contract with the existing supplier may include damages prorated based on the proportion of the obligation already fulfilled under the contract (e.g., terminating a 4-year contract after 3 years).

At 808, the risk controller 110 may determine that the cost of replacing the first supplier with the second supplier and/or a second risk associated with the second supplier satisfy one or more thresholds. In some example embodiments, the risk controller 110 may determine to replace the existing supplier with the alternate supplier if the alternate supplier is associated with a lower cost than the existing supplier and a same (or better) risk profile than the existing supplier. The risk associated with the alternate supplier may be determined by the risk controller 110 applying, to content associated with the alternate supplier, the machine learning model 115 in order to identify incidents associated with the alternate supplier and map these incidents to one or more objectives of the enterprise. In some instances, the risk controller 110 may determine a composite metric for the alternate supplier in order to enable a comparative analysis between the existing supplier and the alternate supplier.

At 810, the risk controller 110 may respond to the cost associated with replacing the first supplier with the second supplier and/or the second risk associated with the second supplier satisfying the one or more thresholds by generating a recommendation to replace the first supplier with the second supplier. For example, the risk controller 110 may determine to replace the existing supplier with the alternate supplier if the alternate supplier is associated with a lower cost than the existing supplier. Moreover, the risk controller 110 may determine to replace the existing supplier with the alternate supplier if the alternate supplier is associated with a same (or better) risk profile than the existing supplier. For instance, a comparative analysis of the risks associated with the existing supplier and the alternate supplier may be performed based on the respective composite metrics of each supplier. The risk controller 110 may determine to replace the existing supplier with the alternate supplier if the alternate supplier is associated with a same (or higher) composite metric than the existing supplier, which indicates that the alternate supplier conforms better to the one or more objectives of the enterprise than the existing supplier.

At 812, the risk controller 110 may generate, in response to one or more user inputs selecting the second supplier, one or more electronic documents associated with the second supplier. In some example embodiments, in response to receiving one or more user inputs selecting the alternate supplier to replace the existing supplier, the risk controller 110 may generate one or more electronic documents associated with the alternate supplier. For example, the risk controller 110 may generate, based at least on the types of incidents the machine learning model 115 identified as being associated with the alternate supplier, one or more electronic documents (e.g., purchase orders, purchase contracts, and/or the like) configured to mitigate the risks associated with the supplier. The one or more electronic documents may include, for example, a contract with one or more clauses, terms, and/or line items addressing the risks associated with the alternate supplier.

In view of the above-described implementations of subject matter this application discloses the following list of examples, wherein one feature of an example in isolation or more than one feature of said example taken in combination and, optionally, in combination with one or more features of one or more further examples are further examples also falling within the disclosure of this application:

Example 1: A system, comprising: at least one data processor; and at least one memory storing instructions, which when executed by the at least one data processor, result in operations comprising: applying, to a first content associated with a first supplier, a machine learning model trained to determine one or more objectives of an enterprise affected by a first incident associated with the first content; detecting, based at least on the one or more objectives of the enterprise affected by the first incident associated with the first content, a change in a first risk associated with the first supplier; in response to detecting the change in the first risk of the first supplier, determining a first cost associated with replacing the first supplier with a second supplier; and in response to the first cost of replacing the first supplier with the second supplier and/or a second risk of the second supplier satisfying one or more thresholds, generating a first electronic document associated with the second supplier.

Example 2: The system of example 1, wherein the operations further comprise: applying, to a second content associated with the second supplier, the machine learning model to determine the one or more objectives of the enterprise affected by a second incident associated with the second content; and determining, based at least on the one or more objectives affected by the second incident associated with the second content, the second risk of the second supplier.

Example 3: The system of example 2, wherein the first risk of the first supplier is determined by at least generating a first composite metric corresponding to the first incident associated with the first content, and wherein the second risk of the second supplier is determined by at least generating a second composite metric corresponding to the second incident associated with the second content.

Example 4: The system of any one of examples 1 to 3, wherein the first content includes one or more news articles, blogposts, and/or social media posts, and wherein the machine learning model is trained to perform a natural language processing on a text comprising the one or more news articles, blogposts, and/or social media posts.

Example 5: The system of any one of examples 1 to 4, wherein the first electronic document is generated to include a second content identified as addressing the second risk of the second supplier.

Example 6: The system of example 5, wherein the first electronic document is generated by at least inserting, into a template, one or more clauses, terms, and/or line items identified as addressing the second risk of the second supplier.

Example 7: The system of any one of examples 1 to 6, wherein the first electronic document comprises a purchase order or a purchase contract.

Example 8: The system of any one of examples 1 to 7, wherein the first cost of replacing the first supplier with the second supplier is further determined in response to detecting a change in a second cost associated with the second supplier, and wherein the first cost of replacing the first supplier with the second supplier is determined based on a second electronic document associated with the first supplier.

Example 9: The system of example 8, wherein the first cost replacing the first supplier with the second supplier is determined by at least identifying, based on a metadata associated with the second electronic document, one or more clauses associated with terminating a contract with the first supplier, and extracting one or more corresponding values.

Example 10: The system of example 9, wherein the metadata associated with the second electronic document is generated based on an output of the machine learning model applied to analyze a second content of the second electronic document.

Example 11: A computer-implemented method, comprising: applying, to a first content associated with a first supplier, a machine learning model trained to determine one or more objectives of an enterprise affected by a first incident associated with the first content; detecting, based at least on the one or more objectives of the enterprise affected by the first incident associated with the first content, a change in a first risk associated with the first supplier; in response to detecting the change in the first risk of the first supplier, determining a first cost associated with replacing the first supplier with a second supplier; and in response to the first cost of replacing the first supplier with the second supplier and/or a second risk of the second supplier satisfying one or more thresholds, generating a first electronic document associated with the second supplier.

Example 12: The method of example 11, wherein the operations further comprise: applying, to a second content associated with the second supplier, the machine learning model to determine the one or more objectives of the enterprise affected by a second incident associated with the second content; and determining, based at least on the one or more objectives affected by the second incident associated with the second content, the second risk of the second supplier.

Example 13: The method of example 12, wherein the first risk of the first supplier is determined by at least generating a first composite metric corresponding to the first incident associated with the first content, and wherein the second risk of the second supplier is determined by at least generating a second composite metric corresponding to the second incident associated with the second content.

Example 14: The method of any one of examples 11 to 13, wherein the first content includes one or more news articles, blogposts, and/or social media posts, and wherein the machine learning model is trained to perform a natural language processing on a text comprising the one or more news articles, blogposts, and/or social media posts.

Example 15: The method of any one of examples 11 to 14, wherein the first electronic document is generated to include a second content identified as addressing the second risk of the second supplier.

Example 16: The method of example 15, wherein the first electronic document is generated by at least inserting, into a template, one or more clauses, terms, and/or line items identified as addressing the second risk of the second supplier.

Example 17: The method of any one of examples 11 to 16, wherein the first electronic document comprises a purchase order or a purchase contract.

Example 18: The method of any one of examples 11 to 17, wherein the first cost of replacing the first supplier with the second supplier is further determined in response to detecting a change in a second cost associated with the second supplier, and wherein the first cost of replacing the first supplier with the second supplier is determined based on a second electronic document associated with the first supplier.

Example 19: The method of example 18, wherein the first cost replacing the first supplier with the second supplier is determined by at least identifying, based on a metadata associated with the second electronic document, one or more clauses associated with terminating a contract with the first supplier, and extracting one or more corresponding values, and wherein the metadata associated with the second electronic document is generated based on an output of the machine learning model applied to analyze a second content of the second electronic document.

Example 20: A non-transitory computer readable medium storing instructions, which when executed by at least one data processor, result in operations comprising: applying, to a first content associated with a first supplier, a machine learning model trained to determine one or more objectives of an enterprise affected by a first incident associated with the first content; detecting, based at least on the one or more objectives of the enterprise affected by the first incident associated with the first content, a change in a first risk associated with the first supplier; in response to detecting the change in the first risk of the first supplier, determining a first cost associated with replacing the first supplier with a second supplier; and in response to the first cost of replacing the first supplier with the second supplier and/or a second risk of the second supplier satisfying one or more thresholds, generating a first electronic document associated with the second supplier.

Figure 9:
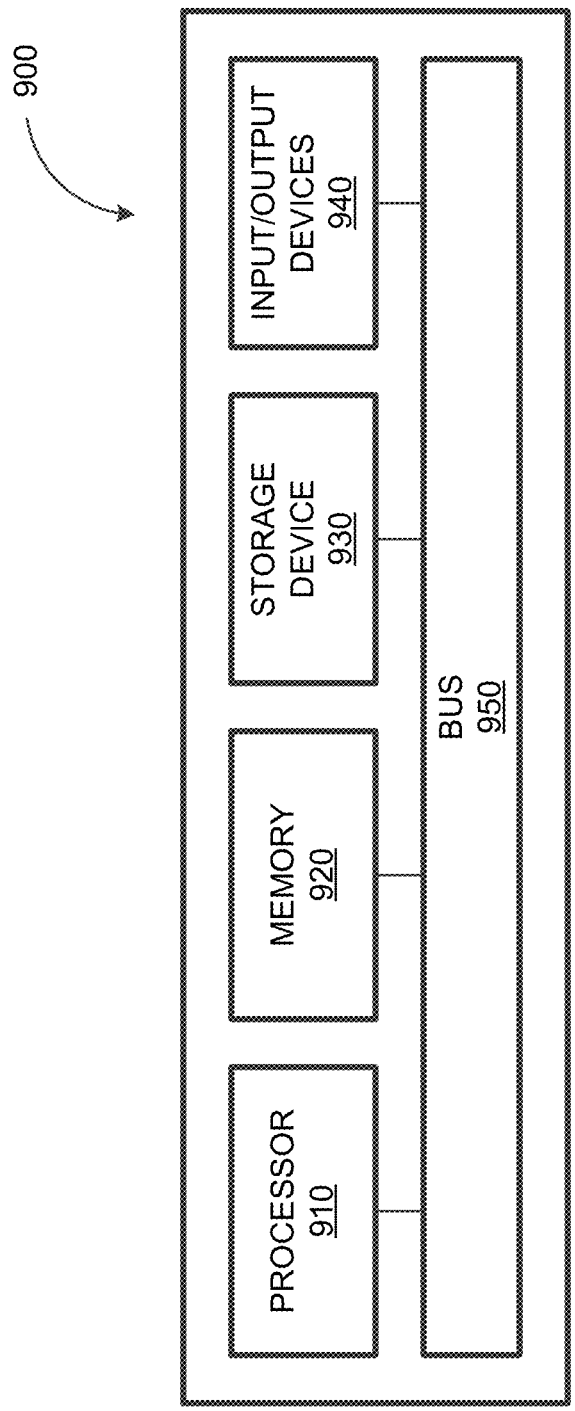
FIG. 9 depicts a block diagram illustrating an example of a computing system, in accordance with some example embodiments; and When practical, similar reference numbers denote similar structures, features, or elements.

FIG. 9 depicts a block diagram illustrating a computing system 900, in accordance with some example embodiments. Referring to FIGS. 1-9, the computing system 900 can be used to implement the risk controller 110 and/or any components therein.

As shown in FIG. 9, the computing system 900 can include a processor 910, a memory 920, a storage device 930, and an input/output device 940. The processor 910, the memory 920, the storage device 930, and the input/output device 940 can be interconnected via a system bus 950. The processor 910 is capable of processing instructions for execution within the computing system 900. Such executed instructions can implement one or more components of, for example, the risk controller 110. In some implementations of the current subject matter, the processor 910 can be a single-threaded processor. Alternately, the processor 910 can be a multi-threaded processor. The processor 910 is capable of processing instructions stored in the memory 920 and/or on the storage device 930 to display graphical information for a user interface provided via the input/output device 940.

The memory 920 is a computer readable medium such as volatile or non-volatile that stores information within the computing system 900. The memory 920 can store data structures representing configuration object databases, for example. The storage device 930 is capable of providing persistent storage for the computing system 900. The storage device 930 can be a floppy disk device, a hard disk device, an optical disk device, or a tape device, or other suitable persistent storage means. The input/output device 940 provides input/output operations for the computing system 900. In some implementations of the current subject matter, the input/output device 940 includes a keyboard and/or pointing device. In various implementations, the input/output device 940 includes a display unit for displaying graphical user interfaces.

According to some implementations of the current subject matter, the input/output device 940 can provide input/output operations for a network device. For example, the input/output device 940 can include Ethernet ports or other networking ports to communicate with one or more wired and/or wireless networks (e.g., a local area network (LAN), a wide area network (WAN), the Internet).

In some implementations of the current subject matter, the computing system 900 can be used to execute various interactive computer software applications that can be used for organization, analysis and/or storage of data in various (e.g., tabular) format (e.g., Microsoft Excel®, and/or any other type of software). Alternatively, the computing system 900 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities or can be standalone computing products and/or functionalities. Upon activation within the applications, the functionalities can be used to generate the user interface provided via the input/output device 940. The user interface can be generated and presented to a user by the computing system 900 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. For example, the logic flows may include different and/or additional operations than shown without departing from the scope of the present disclosure. One or more operations of the logic flows may be repeated and/or omitted without departing from the scope of the present disclosure. Other implementations may be within the scope of the following claims.

What is claimed is:

1. A system, comprising:
    at least one processor; and
    at least one memory including program code which when executed by the at least one processor provides operations comprising:
        training, based at least on a training dataset including a plurality of text samples, a machine learning model, each text sample in the training dataset being associated with a ground truth label corresponding to an objective affected by a type of incident described in the text sample, and the training of the machine learning model including adjusting the machine learning model to minimize a difference in a label output by the machine learning model applied to each text sample in the training dataset and the ground truth label associated with the text sample;
        upon training the machine learning model, applying, to a first content associated with a first supplier, the machine learning model to determine one or more objectives of an enterprise affected by a first incident associated with the first content;
        detecting, based at least on the one or more objectives of the enterprise affected by the first incident associated with the first content, a first change in a first risk associated with the first supplier;
        in response to detecting the first change in the first risk of the first supplier, determining a first cost associated with replacing the first supplier with a second supplier based at least on a first electronic document associated with the first supplier, the first cost associated with replacing the first supplier with the second supplier being determined by at least
            applying the machine learning model to analyze a second content of the first electronic document;
            generating, based at least on an output of the machine learning model applied to analyze the second content of the first electronic document, metadata associated with the first electronic document,
            identifying, based at least on the metadata associated with the first electronic document, one or more clauses associated with terminating a contract with the first supplier, and
            extracting one or more corresponding values;
        determining a second risk associated with the second supplier; and
        in response to the first cost of replacing the first supplier with the second supplier and the second risk of the second supplier satisfying one or more thresholds, generating a second electronic document having one or more clauses, terms, and/or line items addressing the second risk of the second supplier in order to form another contract with the second supplier.

2. The system of claim 1, wherein the operations further comprise:
    applying, to a second content associated with the second supplier, the machine learning model to determine the one or more objectives of the enterprise affected by a second incident associated with the second content; and
    determining, based at least on the one or more objectives affected by the second incident associated with the second content, the second risk of the second supplier.

3. The system of claim 2, wherein the first risk of the first supplier is determined by at least generating a first composite metric corresponding to the first incident associated with the first content, and wherein the second risk of the second supplier is determined by at least generating a second composite metric corresponding to the second incident associated with the second content.

4. The system of claim 1, wherein the first content includes one or more news articles, blogposts, and/or social media posts, and wherein the machine learning model is trained to perform a natural language processing on a text comprising the one or more news articles, blogposts, and/or social media posts.

5. The system of claim 1, wherein the first electronic document and the second electronic document each comprise a purchase order or a purchase contract.

6. The system of claim 1, wherein the first cost of replacing the first supplier with the second supplier is further determined in response to detecting a change in a second cost associated with the second supplier.

7. A computer-implemented method, comprising:
    training, based at least on a training dataset including a plurality of text samples, a machine learning model, each text sample in the training dataset being associated with a ground truth label corresponding to an objective affected by a type of incident described in the text sample, and the training of the machine learning model including adjusting the machine learning model to minimize a difference in a label output by the machine learning model applied to each text sample in the training dataset and the ground truth label associated with the text sample;

upon training the machine learning model, applying, to a first content associated with a first supplier, the machine learning model to determine one or more objectives of an enterprise affected by a first incident associated with the first content;

detecting, based at least on the one or more objectives of the enterprise affected by the first incident associated with the first content, a first change in a first risk associated with the first supplier;

in response to detecting the first change in the first risk of the first supplier, determining a first cost associated with replacing the first supplier with a second supplier based at least on a first electronic document associated with the first supplier, the first cost associated with replacing the first supplier with the second supplier being determined by at least applying the machine learning model to analyze a second content of the first electronic document;

generating, based at least on an output of the machine learning model applied to analyze the second content of the first electronic document, metadata associated with the first electronic document, identifying, based at least on the metadata associated with the first electronic document, one or more clauses associated with terminating a contract with the first supplier, and extracting one or more corresponding values;

determining a second risk associated with the second supplier; and in response to the first cost of replacing the first supplier with the second supplier and the second risk of the second supplier satisfying one or more thresholds, generating a second electronic document having one or more clauses, terms, and/or line items addressing the second risk of the second supplier in order to form another contract with the second supplier.

8. The method of claim 7, further comprising:

applying, to a second content associated with the second supplier, the machine learning model to determine the one or more objectives of the enterprise affected by a second incident associated with the second content; and determining, based at least on the one or more objectives affected by the second incident associated with the second content, the second risk of the second supplier.

9. The method of claim 8, wherein the first risk of the first supplier is determined by at least generating a first composite metric corresponding to the first incident associated with the first content, and wherein the second risk of the second supplier is determined by at least generating a second composite metric corresponding to the second incident associated with the second content.

10. The method of claim 7, wherein the first content includes one or more news articles, blogposts, and/or social media posts, and wherein the machine learning model is trained to perform a natural language processing on a text comprising the one or more news articles, blogposts, and/or social media posts.

11. The method of claim 7, wherein the first electronic document and the second electronic document each comprise a purchase order or a purchase contract.

12. The method of claim 7, wherein the first cost of replacing the first supplier with the second supplier is further determined in response to detecting a change in a second cost associated with the second supplier.

13. A non-transitory computer readable medium storing instructions, which when executed by at least one data processor, result in operations comprising:

training, based at least on a training dataset including a plurality of text samples, a machine learning model, each text sample in the training dataset being associated with a ground truth label corresponding to an objective affected by a type of incident described in the text sample, and the training of the machine learning model including adjusting the machine learning model to minimize a difference in a label output by the machine learning model applied to each text sample in the training dataset and the ground truth label associated with the text sample;

upon training the machine learning model, applying, to a first content associated with a first supplier, the machine learning model to determine one or more objectives of an enterprise affected by a first incident associated with the first content;

detecting, based at least on the one or more objectives of the enterprise affected by the first incident associated with the first content, a first change in a first risk associated with the first supplier;

in response to detecting the first change in the first risk of the first supplier, determining a first cost associated with replacing the first supplier with a second supplier based at least on a first electronic document associated with the first supplier, the first cost associated with replacing the first supplier with the second supplier being determined by at least applying the machine learning model to analyze a second content of the first electronic document;

generating, based at least on an output of the machine learning model applied to analyze the second content of the first electronic document, metadata associated with the first electronic document, identifying, based at least on the metadata associated with the first electronic document, one or more clauses associated with terminating a contract with the first supplier, and extracting one or more corresponding values;

determining a second risk associated with the second supplier; and in response to the first cost of replacing the first supplier with the second supplier and the second risk of the second supplier satisfying one or more thresholds, generating a second electronic document having one or more clauses, terms, and/or line items addressing the second risk of the second supplier in order to form another contract with the second supplier.

\* \* \* \* \*